US012803951B2

(12) United States Patent
Lawton et al.

(10) Patent No.: US 12,803,951 B2
(45) Date of Patent: Nov. 17, 2026

(54) GEOGRAPHIC LOCALIZATION OF INTERNET TRAFFIC USING PUBLIC CLOUD

(71) Applicant: Forcepoint LLC, Austin, TX (US)

(72) Inventors: James Lawton, Cork (IE); Ville Mattila, Helsinki (FI); Darryl Strucko, Broadlands, VA (US)

(73) Assignee: Forcepoint LLC, Austin, TX (US)

( * ) Notice: Subject to any disclaimer, the term of this patent is extended or adjusted under 35 U.S.C. 154(b) by 192 days.

(21) Appl. No.: 18/335,850

(22) Filed: Jun. 15, 2023

(65) Prior Publication Data

US 2024/0422121 A1 Dec. 19, 2024

(51) Int. Cl.

| | |
|---|---|
| ***H04L 61/2582*** | (2022.01) |
| ***H04L 43/08*** | (2022.01) |
| ***H04L 101/604*** | (2022.01) |
| ***H04L 101/69*** | (2022.01) |

(52) U.S. Cl.

CPC .......... *H04L 61/2582* (2013.01); *H04L 43/08* (2013.01); *H04L 2101/604* (2022.05); *H04L 2101/69* (2022.05)

(58) Field of Classification Search

CPC ............... H04L 61/2582; H04L 61/256; H04L 2101/69; H04L 2101/604

See application file for complete search history.

(56) References Cited

U.S. PATENT DOCUMENTS

| | | | | |
|---|---|---|---|---|
| 9,026,145 | B1 * | 5/2015 | Duleba | H04L 61/255 455/456.3 |
| 2005/0055374 | A1 * | 3/2005 | Sato | H04W 4/029 |
| 2016/0359798 | A1 * | 12/2016 | Choquette | H04L 61/4511 |
| 2018/0113972 | A1 * | 4/2018 | Suresh | G06F 30/347 |
| 2019/0019222 | A1 * | 1/2019 | Agrawal | G06Q 50/01 |

OTHER PUBLICATIONS

Kline, E., K. Duleba, Z. Szamonek, S. Moner, and W. Kumari, "RFC 8805 A Format for Self-Published IP Geolocation Feeds", IETF, Aug. 2020, Accessed: https://research.google/pubs/pub49402.pdf. (Year: 2020).*

* cited by examiner

*Primary Examiner* — Nam T Tran

(74) *Attorney, Agent, or Firm* — Jackson Walker L.L.P.

(57) ABSTRACT

A method, system, and computer-readable medium are disclosed for: receiving traffic from a client device, wherein the client device is physically located in a particular region, wherein the traffic is internet protocol (IP) traffic, and wherein the traffic has a destination associated therewith; augmenting the traffic with metadata, wherein the metadata is indicative of the particular region; and transmitting the augmented traffic to an egress gateway, wherein the egress gateway is configured to perform source network address translation (NAT) on the traffic by setting a source address associated with the traffic to an IP address that is associated with the particular region.

15 Claims, 3 Drawing Sheets

GEOGRAPHIC LOCALIZATION OF INTERNET TRAFFIC USING PUBLIC CLOUD

FIELD OF DISCLOSURE

The present disclosure relates in general to the field of computers and similar technologies, and in particular to software utilized in this field. Still more particularly, it relates to performing geographic localization of Internet traffic.

BACKGROUND

While network communication among networked computers, including the use of the Internet, has many advantages, one downside to network communication is that it may render networked computers susceptible to malicious attacks from viruses or other intrusions. Accordingly, security devices such as network firewalls often analyze information regarding network connections, including information about a user and/or executable program that initiated the connection from the client device.

As one of ordinary skill in the art with the benefit of this disclosure will appreciate, public cloud infrastructure is an increasingly important part of internet technology. However, internet traffic that flows through the public cloud generally arrives at the destination server having its source Internet Protocol (IP) address set to the IP address of the last network component in its public cloud path, which is typically an internet gateway or some form of network address translation (NAT) device. Web servers, search engines, and other components may then erroneously assume that that IP address is the true source of the traffic and localize the connection accordingly based on IP geolocation techniques. For example, a search engine may return search results that are specific to the country associated with the traffic's public cloud IP address instead of the true source of the traffic. For traffic that egresses from public cloud infrastructure in a country different from the one it actually originated in, the localization will be incorrect. This problem is especially serious for security services that are delivered via public cloud infrastructure. For purposes of this disclosure, the term "public cloud" refers generally to a shared-infrastructure (e.g., multitenant) model in which computing resources such as storage, processing, and networking are made available on-demand instead of via dedicated hardware.

Accordingly, embodiments of this disclosure provide techniques for improving the localization of internet traffic that travels in whole or in part via the public cloud.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, certain disadvantages and problems associated with existing approaches to network and data security have been reduced or eliminated.

In accordance with embodiments of the present disclosure, a computer-implemented method may include: receiving traffic from a client device, wherein the client device is physically located in a particular region, wherein the traffic is internet protocol (IP) traffic, and wherein the traffic has a destination associated therewith; augmenting the traffic with metadata, wherein the metadata is indicative of the particular region; and transmitting the augmented traffic to an egress gateway, wherein the egress gateway is configured to perform source network address translation (NAT) on the traffic by setting a source address associated with the traffic to an IP address that is associated with the particular region.

In accordance with these and other embodiments of the present disclosure, a system may include at least one processor; and a computer-readable medium embodying instructions executable by the at least one processor for: receiving traffic from a client device, wherein the client device is physically located in a particular region, wherein the traffic is internet protocol (IP) traffic, and wherein the traffic has a destination associated therewith; augmenting the traffic with metadata, wherein the metadata is indicative of the particular region; and transmitting the augmented traffic to an egress gateway, wherein the egress gateway is configured to perform source network address translation (NAT) on the traffic by setting a source address associated with the traffic to an IP address that is associated with the particular region.

In accordance with these and other embodiments of the present disclosure, an article of manufacture may include a non-transitory, computer-readable medium embodying computer program code, the computer program code being executable for: receiving traffic from a client device, wherein the client device is physically located in a particular region, wherein the traffic is internet protocol (IP) traffic, and wherein the traffic has a destination associated therewith; augmenting the traffic with metadata, wherein the metadata is indicative of the particular region; and transmitting the augmented traffic to an egress gateway, wherein the egress gateway is configured to perform source network address translation (NAT) on the traffic by setting a source address associated with the traffic to an IP address that is associated with the particular region.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
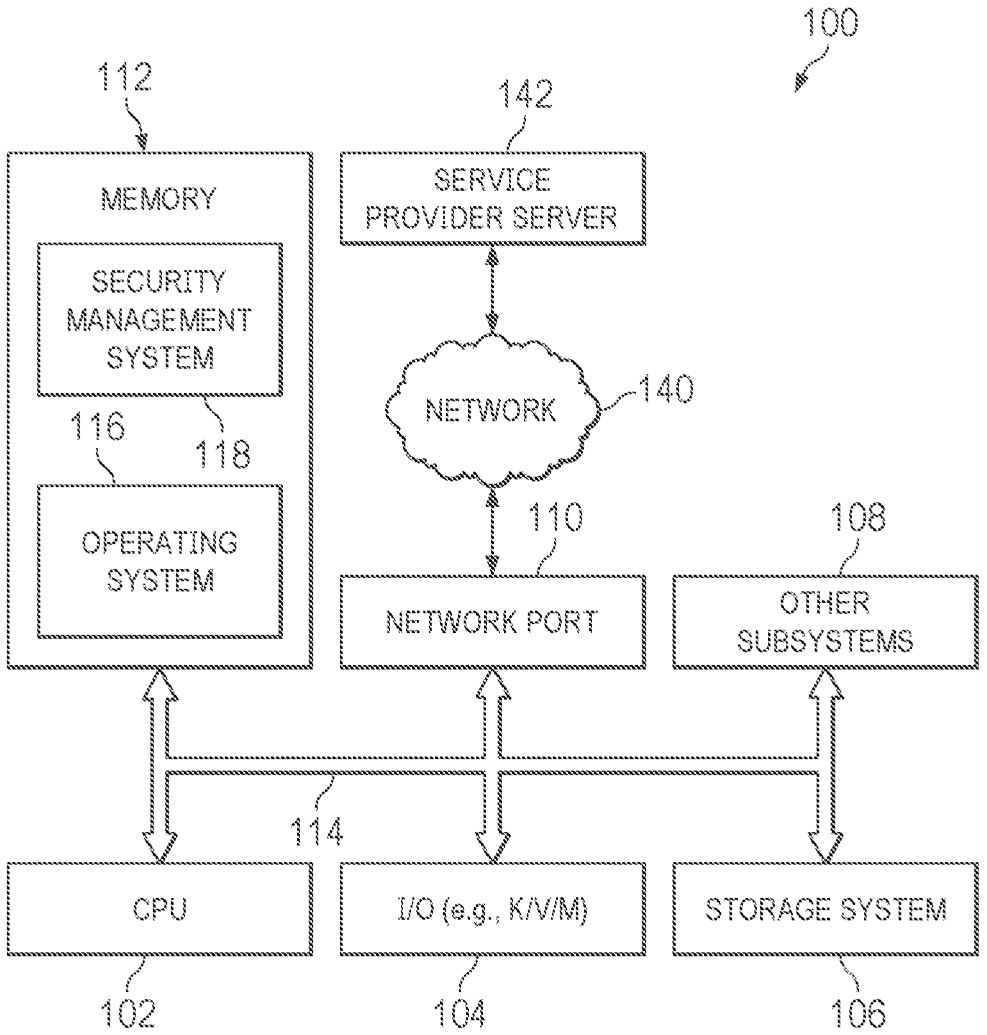
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106 (e.g., a computer-readable medium such as a non-transitory computer-readable medium), and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enable localization for public cloud traffic as described in greater detail below. In some embodiments, security management system 118 and the functionality thereof may improve processor efficiency, and thus the efficiency of information handling system 100, by performing network security operations with greater efficiency and with decreased processing resources as compared to existing approaches for network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 may improve the functionality of information handling system 100 and provide a useful and concrete result of improving network security and performing network security operations with greater efficiency and with decreased processing resources.

Figure 2:
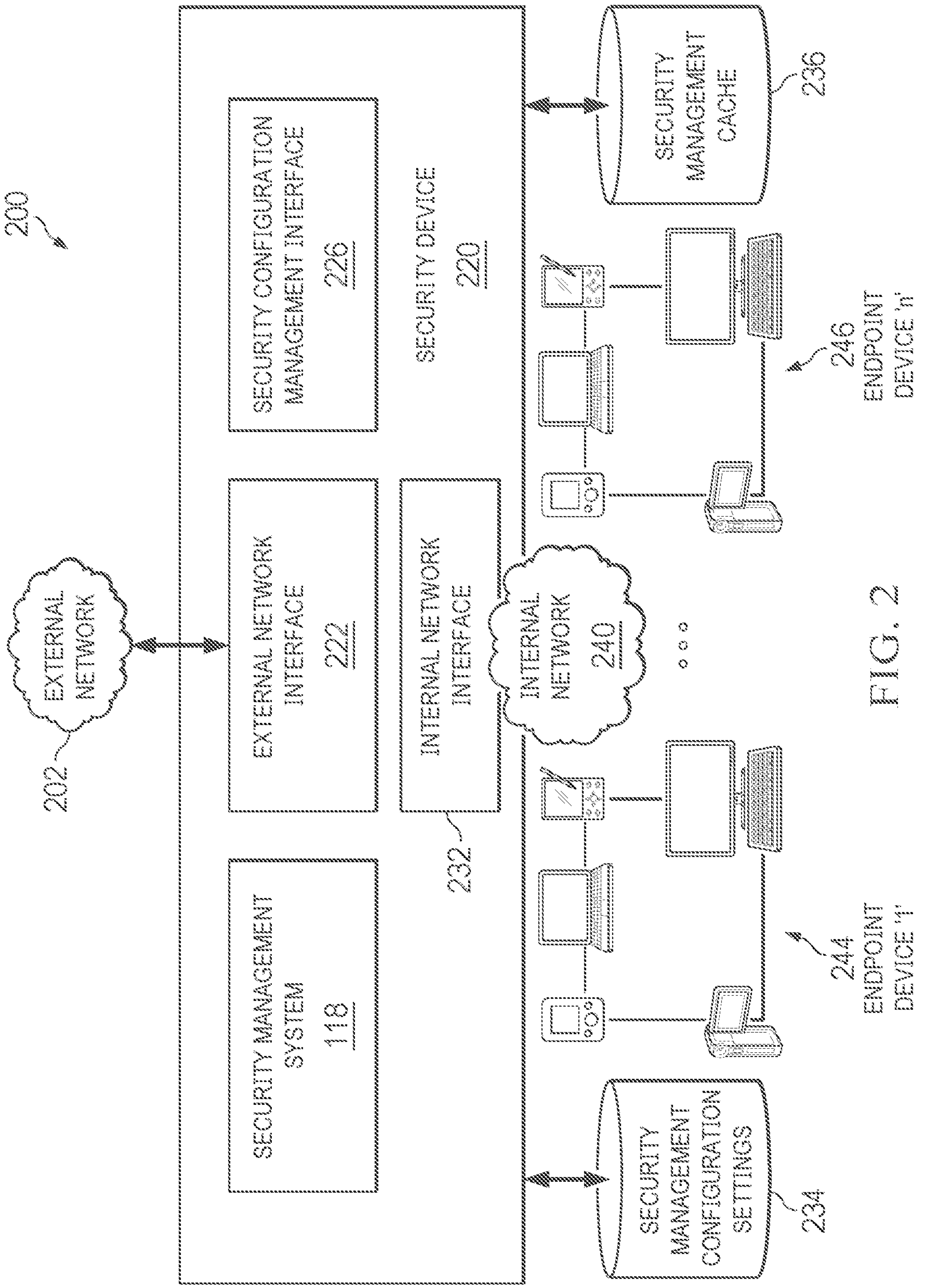
FIG. 2 illustrates a block diagram of a system for performing geographic localization, in accordance with embodiments of the present disclosure.

FIG. 2 illustrates a block diagram of a system 200 for performing localization of public cloud traffic, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a server, a gateway, a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of this disclosure may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling localization of public cloud traffic as described herein.

In some embodiments, security device 220 may implement a geographic localizer service. In some embodiments, security device 220 may be configured to receive traffic from any of endpoint devices '1' 244 through 'n' 246 via internal network interface 232 and transmit that traffic via external network interface 222. Additionally or alternatively, security device 220 may be configured to receive traffic from external systems via external network interface 222. In some embodiments, such traffic may be received from or transmitted to a public cloud IP address. As discussed in more detail below, security device 220 may be configured to perform geographic localization of such traffic.

Figure 3:
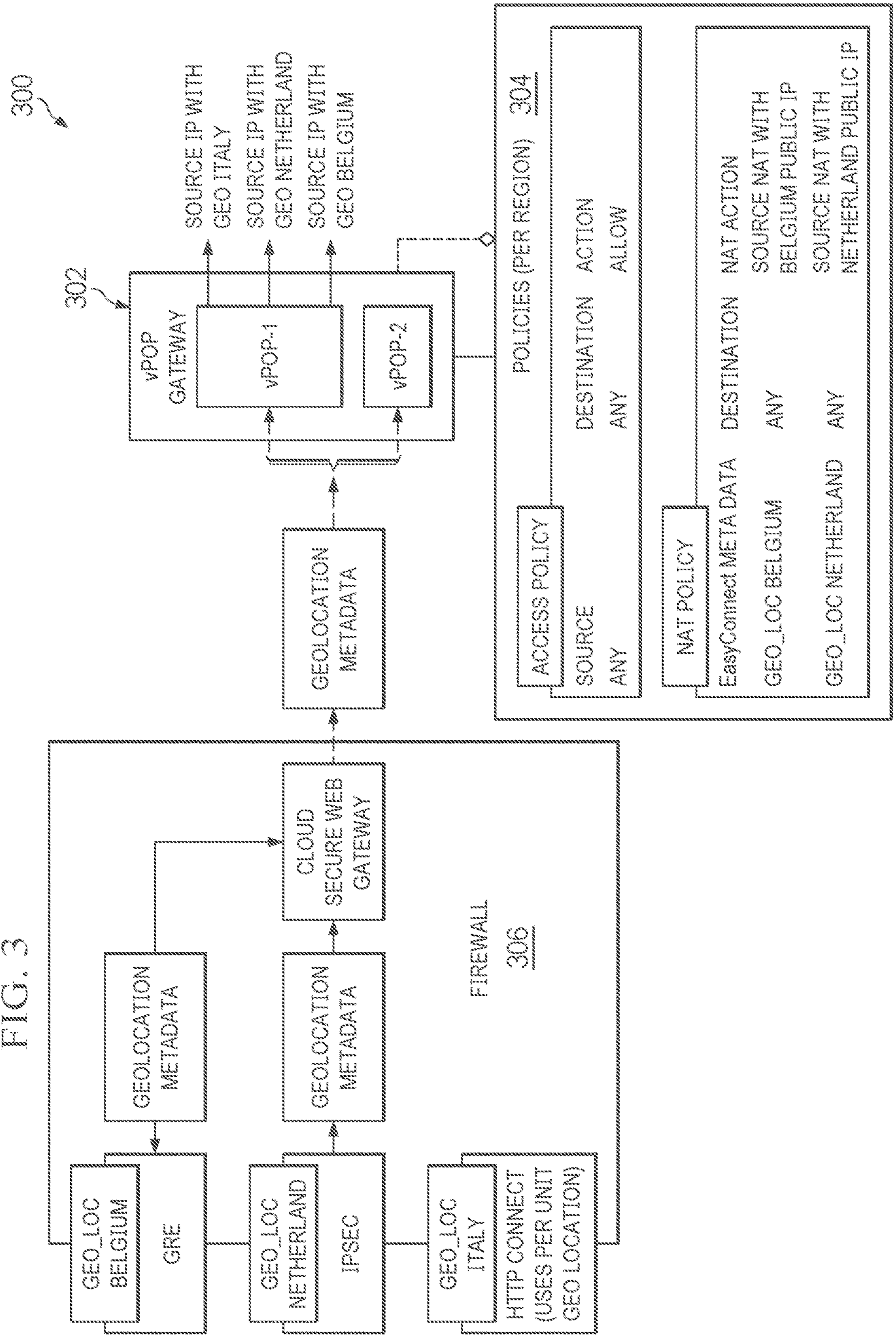
FIG. 3 illustrates a block diagram of a system for performing geographic localization, in according with embodiments of the present disclosure.

FIG. 3 illustrates a block diagram of a system 300 for performing geographic localization of internet traffic using the public cloud, in accordance with embodiments of the present disclosure. In particular, system 300 implements a system referred to herein as a virtual point of presence (vPOP) for the public cloud. As described herein, the vPOP system may provide geographic localization for end users, regardless of where they are located, and it may also enable the provision of dedicated per-customer egress IP addresses.

System 300 includes a vPOP gateway (VGW) 302, which may be configured to perform NAT-type functionality. VGW 302 may implement such functionality based on per-region policies 304, as discussed below. Gateways such as VGW 302 may be deployed in a number of public cloud regions. In one embodiment, not every public cloud region may need its own VGW 302, as long as VGWs 302 are deployed in those regions that allow sufficiently low latency for connections. In general, VGWs 302 are the last (edge) component for egress traffic as it leaves the public cloud region.

Different types of traffic (e.g., Generic Routing Encapsulation (GRE) tunneling. IPSEC, HTTP, etc.) may be received at firewall 306 from various geographic regions. In the example shown, the traffic may arrive from Belgium, the Netherlands, and Italy, respectively. As discussed in more detail below, system 300 may tag such traffic with geolocation metadata to localize it correctly. There are currently approximately 200 countries in the world. To fully support geographic localization features, it would also be advantageous to support some additional localized regions (e.g., country provinces, nations of the UK, states within the USA, etc.).

Let C be the number of unique countries and regions that are to be supported by system 300. A Classless Inter-Domain Routing (CIDR) block (e.g., an IPv4 and/or IPv6 CIDR block) may be assigned from IP address pools for each public cloud region that hosts a VGW 302. The CIDR block should have sufficient IP addresses for some multiple of the number of countries to be supported, which may be calculated as follows.

For the sake of concreteness and clarity, the following discussion refers to IPv4 blocks, but one of ordinary skill in the art with the benefit of this disclosure will understand its applicability to IPv6 and/or other technologies as well. For example, in an IPv6 implementation, the individual addresses may be 128-bit instead of 32-bit. The CIDR blocks may also be slightly different (e.g., using an IPv6/48 block instead of an IPv4/24 block).

Let R be the number of public cloud regions that are to support localization services. For example, if a /24 CIDR block (254 IP addresses) is used for each region, then each of 250 countries and regions can be assigned one IP address. For reliability, however, it is desirable to deploy multiple instances of VGW 302 in each of the public cloud regions that will host localization services (e.g., in an auto-scaling cluster). Let N be the number of VGW instances that will be deployed in each vPOP region. The IP CIDR block assigned to each public cloud region should therefore contain N*C individual IP addresses.

For example, if we wish to support 250 localization regions (C=250) and have 2 VGW instances per public cloud region (N=2), then 500 IP addresses per public cloud region are needed. In other words, a/23 CIDR block should be supplied.

In general, the total number of IP addresses required is R*N*C.

For example, if C=250, N=2, and the number of public cloud regions supporting localization is R=10, then 5000 IP addresses would be needed in total. This might be satisfied by providing ten/23 CIDRs.

VGW 302 may also be configured to accept HTTP/S connections from other security services, such as secure web gateways (SWG), cloud access security brokers (CASB), data loss prevention (DLP) components, remote browser isolation (RBI) components, etc.

According to one embodiment, the geolocation metadata described herein may be encoded according to a preexisting proxy metadata protocol such as Forcepoint® EasyConnect™. For example, connections transmitted by other security services to the VGWs 302 may contain EasyConnect connection metadata that has a geolocation_id attribute, which may specify an unsigned 32-bit integer. According to one embodiment, this may be encoded according to a standard such as ISO 3166-1, which specifies numeric codes associated with countries and regions. Table 1 below shows one example of a possible encoding scheme for the geolocation_id.

TABLE 1

| Geolocation Code Range | Purpose |
|---|---|
| 0-1023 | Country code (e.g., ISO 3166-1 numeric) |
| 1024-65535 | Region code (e.g., extended ISO 3166-1 numeric) |
| 65536-131071 | Customer dedicated egress IP addresses |
| 131072+ | Reserved for future use |

The geolocation_id for a connection may be determined based on the geolocation of the user source IP, or it may be determined by some other localization preference specified by the user or by customer policy.

As indicated in Table 1, an embodiment may use an extended version of ISO 3166-1 numeric. ISO 3166-1 numeric is a sparse allocation that currently uses values from 4 to 894. One implementation may use values in the range 0-1023 to represent countries, values in the range 1024-65535 to represent provinces/regions, and values in the range 65536-131071 for per-customer dedicated egress IP addresses.

When the VGW 302 instance receives a connection with a valid geolocation_id, it may look up a mapping of country codes to country IP addresses. If it has an available IP address matching the country code, it may perform source NAT (translation of the source IP address of packets) on the connection with the country IP and then forward the connection to its destination. The connection may be forwarded with the metadata intact, or the metadata may be stripped from the traffic prior to forwarding.

In one embodiment, DNS may be used to find the closest VGW 302. DNS may be set up to measure latency to each of the VGW regions, and so traffic may be directed to the closest (shortest latency) healthy region.

Within a given VGW region, the DNS may resolve to a load balancer, behind which multiple VGW 302 instances are deployed in an auto-scaling group. The load balancer monitors the health of VGWs 302 and balances the traffic load between them. The auto-scaling group may automatically launch new instances of VGWs 302 to replace any that have failed. Similarly, this may be used to enable upgrades of VGW instances without downtime.

A database of IP addresses with their country code assignments may be maintained by the operators of system 300. When changes are made to this database, a service may automatically generate an updated feed according to RFC 8805, which specifies a format for self-published IP geolocation feeds. RFC 8805 feeds are CSV files containing a row for each specific IP address or CIDR block, and the ISO-3166 alphanumeric code for the country and (optionally) region. The updated feed may be submitted to the various organizations that manage IP address geo-location information.

In some embodiments, the RFC 8805 feed may specify varying numbers of IP addresses for each country or region. For example, a country that accounts for a large amount of traffic may be associated with several IP addresses, while a country that is rarely used may be associated with only one or two IP addresses.

As noted above, some embodiments may be implemented in terms of IPv6 instead of (or in addition to) IPv4. The RFC 8805 feed is designed to support both. For example, in an IPv6 implementation, IPv6 CIDR blocks may be assigned to cloud regions where one or more VGWs are present. Fine-grained RFC 8805 information may then be generated for per-country addresses at level of a /32 (IPv4) or a /128 (IPv6) within those blocks.

Thus embodiments of this disclosure may provide many benefits. Public cloud infrastructure currently does not offer an easy, scalable, and cost-effective way to provide localized IP addresses. The VGW described herein is a general-purpose localization system, which may be used for web traffic as well as other protocols.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor(s) to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. A computer-implemented method for performing geographic localization, comprising:

receiving traffic from a client device, wherein the client device is physically located in a particular region, wherein the traffic is internet protocol (IP) traffic, wherein the traffic has a destination associated therewith, and wherein the receiving is carried out by an information handling system in a public cloud region;

augmenting the traffic with metadata by adding a tag comprising the metadata to the traffic, wherein the metadata is indicative of the particular region; and transmitting the augmented traffic including the tag to an egress gateway, wherein the egress gateway is configured to perform source network address translation (NAT) on the traffic by setting a source address associated with the traffic to a public cloud IP address that is associated with the particular region.

2. The method of claim 1, further comprising updating a geolocation feed including the IP address that is associated with the particular region.

3. The method of claim 2, wherein the geolocation feed is an RFC 8805 feed.

4. The method of claim 1, wherein the particular region is a particular country.

5. The method of claim 1, wherein the egress gateway is further configured to transmit the traffic to the destination.

6. A system comprising:

at least one processor; and a computer-readable medium embodying instructions executable by the at least one processor for:

receiving traffic from a client device, wherein the client device is physically located in a particular region, wherein the traffic is internet protocol (IP) traffic, wherein the traffic has a destination associated therewith, and wherein the receiving is carried out by an information handling system in a public cloud region;

augmenting the traffic with metadata by adding a tag comprising the metadata to the traffic, wherein the metadata is indicative of the particular region; and transmitting the augmented traffic including the tag to an egress gateway, wherein the egress gateway is configured to perform source network address translation (NAT) on the traffic by setting a source address associated with the traffic to a public cloud IP address that is associated with the particular region.

7. The system of claim 6, wherein the instructions are further executable for updating a geolocation feed including the IP address that is associated with the particular region.

8. The system of claim 7, wherein the geolocation feed is an RFC 8805 feed.

9. The system of claim 6, wherein the particular region is a particular country.

10. The system of claim 6, wherein the egress gateway is further configured to transmit the traffic to the destination.

11. An article of manufacture comprising a non-transitory, computer-readable medium embodying computer program code, the computer program code being executable for:

receiving traffic from a client device, wherein the client device is physically located in a particular region, wherein the traffic is internet protocol (IP) traffic, wherein the traffic has a destination associated therewith, and wherein the receiving is carried out by an information handling system in a public cloud region;

augmenting the traffic with metadata by adding a tag comprising the metadata to the traffic, wherein the metadata is indicative of the particular region; and transmitting the augmented traffic including the tag to an egress gateway, wherein the egress gateway is configured to perform source network address translation (NAT) on the traffic by setting a source address associated with the traffic to a public cloud IP address that is associated with the particular region.

12. The article of claim 11, wherein the computer program code is further executable for updating a geolocation feed including the IP address that is associated with the particular region.

13. The article of claim 12, wherein the geolocation feed is an RFC 8805 feed.

14. The article of claim 11, wherein the particular region is a particular country.

15. The article of claim 11, wherein the egress gateway is further configured to transmit the traffic to the destination.

* * * * *